(12) United States Patent
Lim (10) Patent No.: US 7,438,154 B2
(45) Date of Patent: Oct. 21, 2008

(54) AUTOMOTIVE STEERING RACK STROKE ADJUSTING DEVICE

(75) Inventor: Yong-Seob Lim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 397 days.

(21) Appl. No.: 11/304,940

(22) Filed: Dec. 14, 2005

(65) Prior Publication Data

US 2006/0169527 A1    Aug. 3, 2006

(30) Foreign Application Priority Data

Dec. 22, 2004    (KR) .................... 10-2004-0110760

(51) Int. Cl.
*B62D 5/06* (2006.01)
(52) U.S. Cl. .............. 180/422; 180/421; 280/5.52; 280/5.521
(58) Field of Classification Search ........... 180/422, 180/421
See application file for complete search history.

(56) References Cited

U.S. PATENT DOCUMENTS

| | | | |
|---|---|---|---|
| 5,573,088 A * | 11/1996 | Daniels ............... | 188/267 |
| 6,578,862 B2 * | 6/2003 | Park et al. ............ | 280/444 |
| 6,588,770 B1 * | 7/2003 | Lee ..................... | 280/5.52 |
| 2004/0074703 A1 * | 4/2004 | Miyoshi ............... | 187/277 |
| 2005/0064993 A1 * | 3/2005 | Ginther et al. ....... | 477/166 |
| 2005/0189190 A1 * | 9/2005 | Kowalsky et al. .... | 192/20 |
| 2007/0295542 A1 * | 12/2007 | Raue ................... | 180/6.38 |

FOREIGN PATENT DOCUMENTS

| | | |
|---|---|---|
| DE | 19963871 | 1/2001 |
| EP | 1 182 115 A2 | 2/2002 |
| JP | 2001-001916 | 1/2001 |

* cited by examiner

*Primary Examiner*—Lesley D. Morris
*Assistant Examiner*—Tashiana Adams
(74) *Attorney, Agent, or Firm*—Morgan Lewis & Bockius LLP (57) ABSTRACT

An automotive steering rack stroke adjusting device is disclosed that detects a change in a gap defined between steerable wheels and a vehicle body depending on a change in the stroke of the steerable wheels using a vehicle height sensor, and automatically adjusts the rotation of a plurality of rotary bodies with respect to a stop plate of a steering rack, so that the optimized maximum stroke of the steering rack can be set according to the driving conditions of the vehicle. Furthermore, the present invention is able to increase an adjustment range of the stroke of the steering rack, so that a minimum rotation radius of the vehicle may be reduced, thus markedly enhancing the driving convenience.

8 Claims, 7 Drawing Sheets

AUTOMOTIVE STEERING RACK STROKE ADJUSTING DEVICE

CROSS-REFERENCE TO RELATED APPLICATIONS

The present application is based on, and claims priority from, Korean Application Serial Number 10-2004-0110760, filed on Dec. 22, 2004, the disclosure of which is hereby incorporated by reference herein in its entirety.

FIELD OF THE INVENTION

The present invention relates to automotive steering rack stroke adjusting device and, more particularly, to a device which is able to automatically adjust the stroke of a steering rack in steps according to the driving conditions of a vehicle.

BACKGROUND OF THE INVENTION

Generally, a stroke of a steering rack of a vehicle is determined in consideration of two desired goals. First, in order to be prepared for when it is desired to install chains around the tiers, a predetermined gap must be defined between the tire and elements adjacent to the tire. Second, a minimum rotation radius of the vehicle must be able to be reduced such that a driver can easily steer during a U-turn or while parking.

When considering the first requirement, the stroke of the steering rack should be reduced, but when considering the second requirement, the stroke of the steering rack should be increased. In order to satisfy the two contrary requirements, a steering rack stroke adjusting device has been required. Such devices have been disclosed in U.S. Pat. No. 6,578,862 and in U.S. Pat. No. 6,578,862.

Typically, steerable wheels of the vehicle move vertically with respect to the vehicle body in response to the driving conditions of the vehicle. Furthermore, the gap defined between each steerable wheel and the vehicle body to allow for the installation of a chain changes depending on a change in the stroke of the steerable wheel. The present invention takes advantage of this characteristic.

SUMMARY OF THE INVENTION

The present invention provides an automotive steering rack stroke adjusting device, which automatically sets the optimized maximum stroke of the steering rack suitable for the driving conditions of the vehicle according to a change in a gap defined between steerable wheels and a vehicle body depending on a change in the stroke of steerable wheels, and which is able to increase an adjustment range of the stroke of the steering rack, so that a minimum rotation radius of the vehicle may be reduced, thus markedly enhancing driving convenience.

According to a preferred embodiment of the prevent invention, an automotive steering rack stroke adjusting device, including: a plurality of rotary bodies provided on each of opposite ends of a power cylinder, into which a steering rack is inserted so as to be linearly movable, the plurality of rotary bodies overlapping each other in a longitudinal direction of the steering rack; a stop plate fastened to each of opposite sides of the steering rack, so that the stop plate is in a state of being inserted into a central portion of at least one rotary body or is in a state of being in contact with an outer surface of one rotary body, depending on rotation of the rotary bodies; a motor to apply a rotating force to one of the rotary bodies; a vehicle height sensor to measure a vehicle height; and a controller to control the motor using a signal transmitted from the vehicle height sensor.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, a preferred embodiment of the present invention will be described in detail with reference to the attached drawings.

Figure 1:
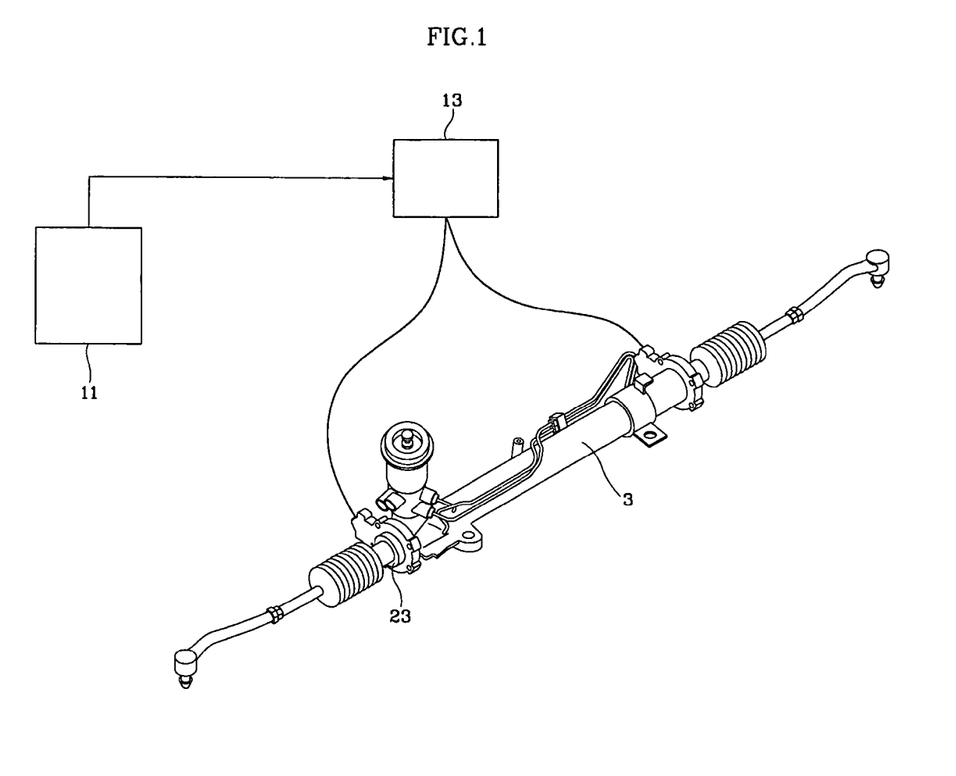
FIG. 1 is a view showing the construction of an automotive steering rack stroke adjusting device, according to an embodiment of the present invention.
Figure 2:
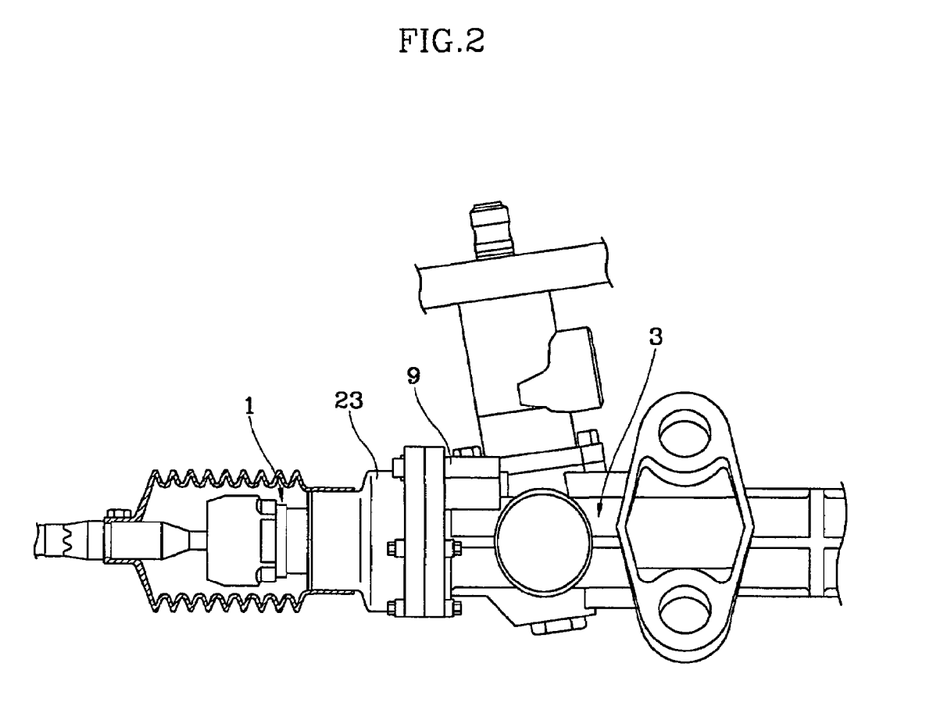
FIG. 2 is a view showing a part of the automotive steering rack stroke adjusting device of FIG. 1 which is provided on an end of a power cylinder.
Figure 3:
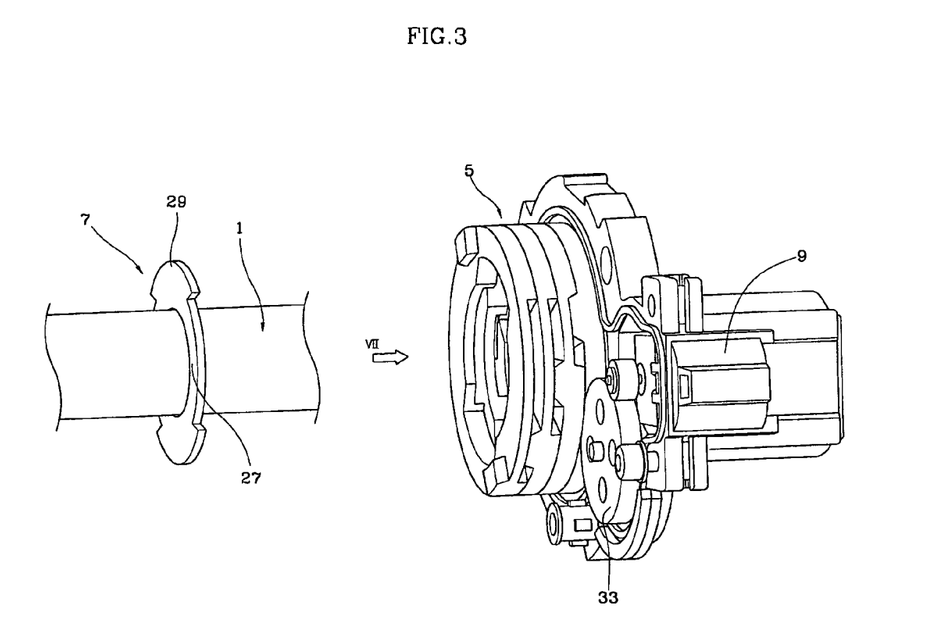
FIG. 3 is a perspective view showing both a stop plate, provided on a steering rack, and a plurality of rotary bodies of the automotive steering rack stroke adjusting device of FIG. 2, from which a cover has been removed.
Figure 4:
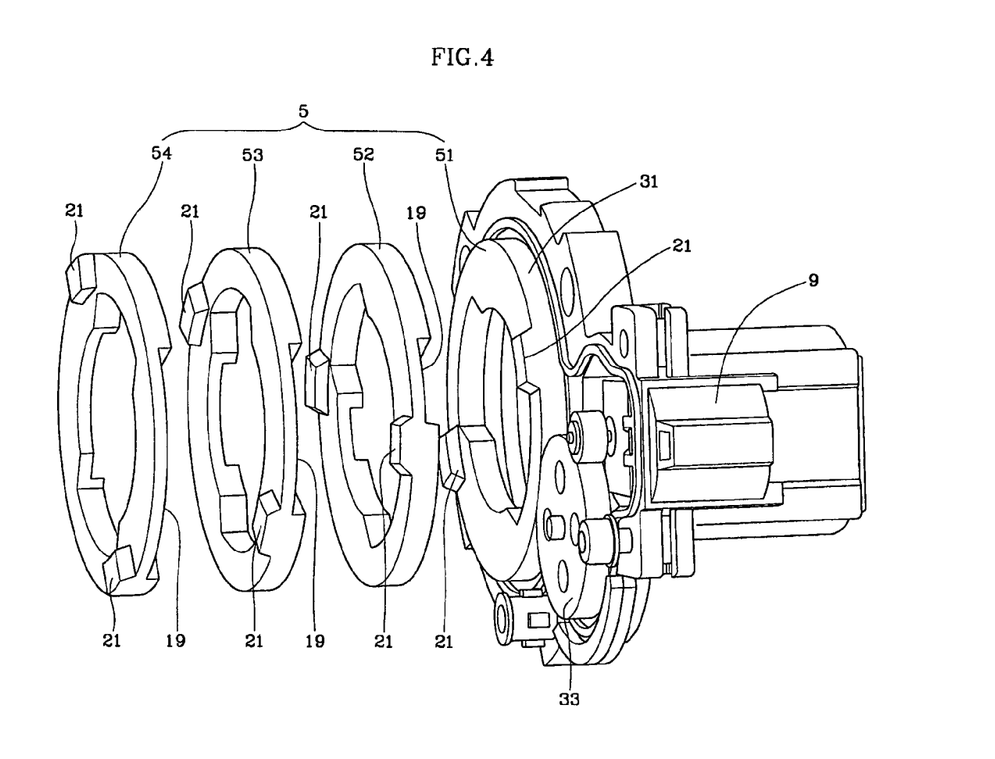
FIG. 4 is an exploded perspective view showing the rotary bodies of FIG. 3.
Figure 5:
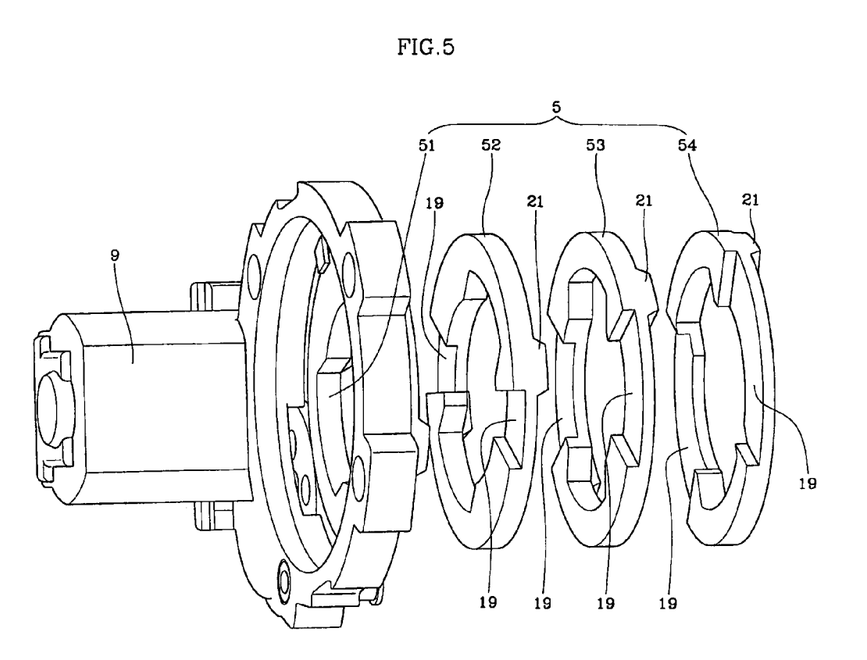
FIG. 5 is a rear view of FIG. 4.
Figure 6:
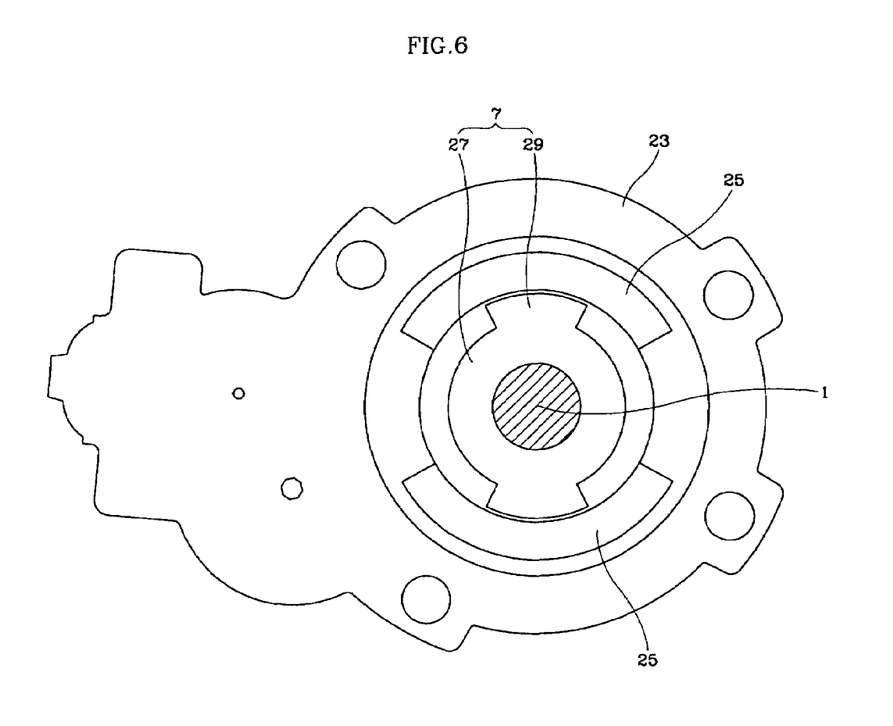
FIG. 6 is a view showing the steering rack and the stop plate mounted in the cover, according to the present invention.
Figure 7:
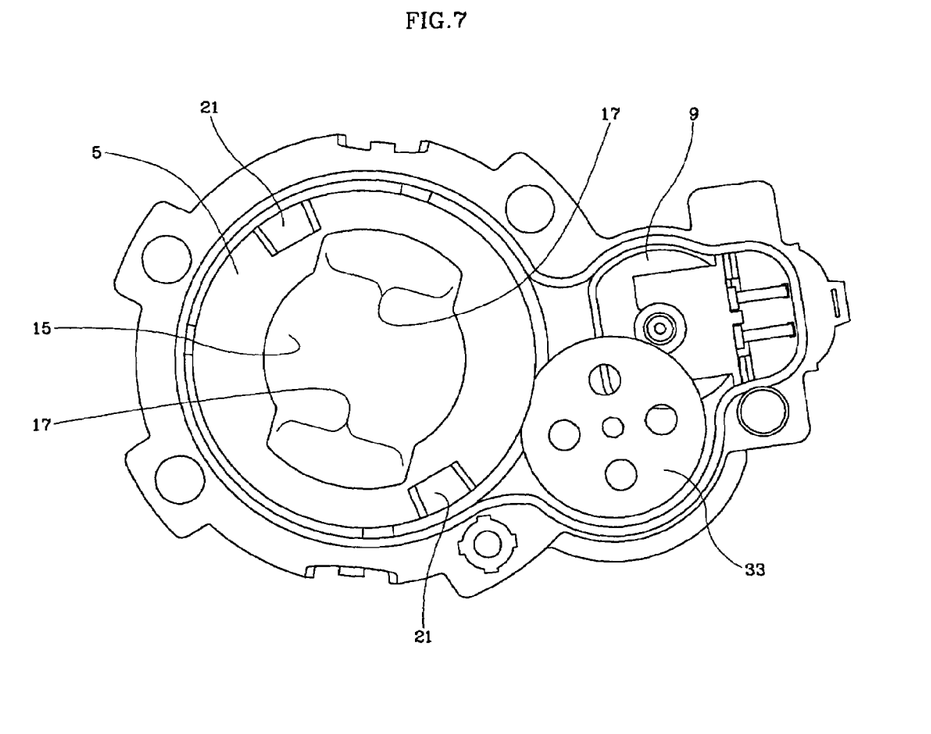
FIG. 7 is a view showing the structure of the automotive steering rack stroke adjusting device from the direction indicated by the arrow VII of FIG. 3.

Referring to FIGS. 1 through 7, an automotive steering rack stroke adjusting device according to the preferred embodiment of the present invention includes a plurality of rotary bodies 5 which are provided on each of opposite ends of a power cylinder 3, into which a steering rack 1 is inserted to be linearly movable. The rotary bodies 5 overlap each other in the longitudinal direction of the steering rack 1. The automotive steering rack stroke adjusting device further includes a stop plate 7, which is fastened to each of opposite sides of the steering rack 1, so that the stop plate 7 is in a state of being inserted into a central portion of at least one rotary body 5 or is in a state of being in contact with an outer surface of one rotary body 5, depending on rotation of the rotary bodies 5. The automotive steering rack stroke adjusting device further includes a motor 9 which provides one rotary body 5 with a rotating force, a vehicle height sensor 11 which measures a vehicle height, and a controller 13 which controls the motor 9 using a signal transmitted from the vehicle height sensor 11.

Each rotary body 5 has a central hole 15 which is formed at a central portion in the rotary body 5, such that the rotary body 5 has a doughnut shape, and a hole extension 17 which is formed in the rotary body 5 and radially extends outwards from the central hole 15. Each rotary body 5 further has a control groove 19 and a control protrusion 21 which are provided on respective facing surfaces of two adjacent rotary bodies 5 and correspond to each other. Thus, the rotary bodies 5 are converted between a state of being independent of rotation of one rotary body 5 and a state of being dependent on the rotation of the rotary body 5 to rotate along with the rotary body 5.

In this embodiment, lengths of respective control grooves 19, which are formed in the rotary bodies 5, increase from a medial position to an end of the steering rack 1. Furthermore, the control grooves 19 are formed in the surfaces of the rotary bodies 5 that face towards the medial position of the steering rack 1, and the control protrusions 21 are formed in the surfaces of the rotary bodies 5 that face towards the end of the steering rack 1.

The automotive steering rack stroke adjusting device of the present invention further includes a cover 23 which covers both the rotary bodies 5 and the stop plate 7 of the steering rack 1. A cover control groove 25 is formed in the cover 23 so as to limit the range of rotation of the control protrusion 21 of the rotary body 5 that is located closest to the end of the steering rack 1. Meanwhile, the rotary body 5 that is located closest to the medial position of the steering rack 1 has no control groove 19, because it is not required.

In this embodiment, the rotary bodies 5 comprise first, second, third and fourth rotary bodies 51, 52, 53 and 54 which overlap each other and are sequentially arranged from the medial portion to the end of the steering rack 1. That is, the rotary body 5 located closest to the medial position of the steering rack 1 is the first rotary body 51, and the rotary body 5 located closest to the end of the steering rack 1 is the fourth rotary body 54.

Furthermore, two hole extensions 17 are formed at opposite positions spaced apart at 180° based on the center of the central hole 15 of each rotary body 5. The stop plate 7 includes a main plate body 27 which has a predetermined diameter allowing the main plate body 27 to be inserted into the central hole 15 of the rotary body 5, and a plate extension part 29 which extends outwards from the main plate body 27 such that the plate extension part 29 is allowed to be inserted into the hole extension 17 of the rotary body 5.

The first rotary body 51 has a gear teeth part 31 which is formed on a circumferential outer surface of the first rotary body 51. An intermediate gear 33 is interposed between the gear teeth part 31 and the motor 9, so that rotating force of the motor 9 is transmitted to the first rotary body 51 through the intermediate gear 33.

Detailed tooth shapes of the gear teeth part 31 and the intermediate gear 33 are not shown in the drawings.

The stroke of steerable wheels, that is, the motion of the steerable wheels with respect to the vehicle body, is detected by the vehicle height sensor 11.

In detail, in the case in which the steerable wheels ascend towards the vehicle body, the vehicle height is reduced. Conversely, when the steerable wheels move away from the vehicle body, the vehicle height is increased.

Therefore, the controller 13 can indirectly determine the change in a gap to be defined between tires of the steerable wheels and the vehicle body using a signal transmitted from the vehicle height sensor 11. The motor 9 is operated according to the change in the gap, so that the stroke of the steering rack 1 can be appropriately adjusted according to the driving conditions of the vehicle.

Hereinafter, the operation of the steering rack stroke adjusting device of the present invention will be explained in steps on the assumption that the maximum stroke state of the steering rack, that is, the state in which the hole extensions 17 of the rotary bodies 5 correspond to each other and the plate extension parts 29 of the stop plate 7 of the steering rack 1 are aligned with the hole extensions 17 so that the stop plate 7 may be inserted into the central portions of all rotary bodies 5, is the initial state of the device.

When the motor 9 is rotated by the controller 13, the rotating force of the motor 9 is transmitted to the first rotary body 51 through the intermediate gear 33, thus rotating the first rotary body 51. Here, while the control protrusion 21 of the first rotary body 51 moves in the control groove 19 of the second rotary body 52, the first rotary body 51 rotates alone without rotating the second rotary body 52. After contact of the control protrusion 21 of the first rotary body 51 with one end of the control groove 19 of the second rotary body 52, the second rotary body 52 rotates along with the first rotary body 51.

When the first rotary body 51 is in the state of rotating alone without rotating the second rotary body 52, the stop plate 7 of the steering rack 1 may be sequentially inserted into the fourth, third and second rotary bodies 54, 53 and 52 but cannot be inserted into the first rotary body 51. Therefore, in this case, the first rotary body 51 limits the linear movement of the steering rack 1. As a result, the stroke of the steering rack 1 is reduced compared to the initial state.

If the first rotary body 51 rotates further, the second rotary body 52 rotates along with the first rotary body 51. At this time, while the control protrusion 21 of the second rotary body 52 moves in the control groove 19 of the third rotary body 53, the second rotary body 52 rotates without rotating the third rotary body 53.

Therefore, when the second rotary body 51 is in the state of being rotated by the rotating force, transmitted from the first rotary body 51, without rotating the third rotary body 53, the stop plate 7 of the steering rack 1 may be sequentially inserted into the fourth and third rotary bodies 54 and 53 but cannot be inserted into the second or first rotary body 52 or 51. Consequently, the stroke of the steering rack 1 is limited by the second rotary body 52. In this case, the stroke of the steering rack 1 is less than the stroke of the steering rack 1 when only the first rotary body 51 is rotated from the initial state.

If the first rotary body 51 rotates further from the above state, the third rotary body 53 rotates along with the first and second rotary bodies 51 and 52. While the control protrusion 21 of the third rotary body 53 moves in the control groove 19 of the fourth rotary body 54, the third rotary body 53 rotates without rotating the fourth rotary body 54.

Therefore, when the third rotary body 53 is in the state of being rotated by the rotating force, sequentially transmitted from the first and second rotary bodies 51 and 52, without rotating the fourth rotary body 54, the stop plate 7 of the steering rack 1 may be inserted into the fourth rotary body 54 but cannot be inserted into the third, second or first rotary body 53, 52 or 51. Consequently, the stroke of the steering rack 1 is limited by the third rotary body 53. In this case, the stroke of the steering rack 1 is less than the stroke of the steering rack 1 when only the first and second rotary bodies 51 and 52 are rotated from the initial state.

If the first rotary body 51 rotates further from the above state, the fourth rotary body 54 rotates along with the first, second and third rotary bodies 51, 52 and 53. At this time, the control protrusion 21 of the fourth rotary body 54 rotates in the cover control groove 25 of the cover 23.

When the fourth rotary body 54 is in the state of being rotated, the stop plate 7 of the steering rack 1 cannot be inserted into the fourth rotary body 54 or into the first, second or third rotary body 51, 52 or 53. Consequently, the stroke of the steering rack 1 is limited by the fourth rotary body 54. In this case, the stroke of the steering rack 1 is less than the stroke of the steering rack 1 when only the first, second and third rotary bodies 51, 52 and 53 are rotated from the initial state. The stroke of the steering rack 1 of this state is the minimum stroke of the steering rack 1.

In order to increase the stroke of the steering rack 1 from the above state, the motor 9 is reversely rotated.

In detail, when the motor 9 is reversely rotated, at first, only the first rotary body 51 rotates, and then the second rotary body 52 rotates along with the first rotary body 51, and then the third rotary body 53 rotates along with the first and second rotary bodies 51 and 52, and then the fourth rotary body 54 rotates along with the first, second and third rotary bodies 51, 52 and 53. Thereby, the stop plate 7 of the steering rack 1 may be inserted into the central hole 15 of the fourth rotary body 54.

As such, when the first, second, third and fourth rotary bodies 51, 52, 53 and 54 are returned to their initial state by reverse rotation, the steering rack 1 is returned to the maximum stroke state.

Meanwhile, in order to increase the stroke of the steering rack 1 slightly from the minimum stroke state, after the first, second, third and fourth rotary bodies 51, 52, 53 and 54 are reversely rotated such that the steering rack 1 is in the maximum stroke state, the first, second and third rotary bodies 51, 52 and 53 are again rotated in the regular direction such that the third rotary body 53 limits the linear movement of the stop plate 7 of the steering rack 1.

Furthermore, in this state, in order to put the steering rack 1 in a state such that the second rotary body 52 limits the stroke of the steering rack 1, the first, second and third rotary bodies 51, 52 and 53 are reversely rotated so as to return them to their initial state and, thereafter, the first and second rotary bodies 51 and 52 are again rotated in the regular direction.

As apparent from the foregoing, the present invention provides an automotive steering rack stroke adjusting device, which determines the change in a gap defined between steerable wheels and a vehicle body depending on a change in the stroke of the steerable wheels using a vehicle height sensor, and automatically adjusts the rotation of a plurality of rotary bodies with respect to a stop plate of a steering rack, so that the optimized maximum stroke of the steering rack can be set according to the driving conditions of the vehicle. Furthermore, the present invention is able to increase the adjustment range of the stroke of the steering rack, so that a minimum rotation radius of the vehicle may be reduced, thus markedly enhancing driving convenience.

What is claimed is:

1. An automotive steering rack stroke adjusting device, comprising:
    a plurality of rotary bodies provided on each of opposite ends of a power cylinder, into which a steering rack is inserted so as to be linearly movable, the plurality of rotary bodies overlapping each other in a longitudinal direction of the steering rack;
    a stop plate fastened to each of opposite sides of the steering rack, so that the stop plate is in a state of being inserted into a central portion of at least one rotary body or is in a state of being in contact with an outer surface of one rotary body, depending on rotation of the rotary bodies;
    a motor to apply a rotating force to one of the rotary bodies;
    a vehicle height sensor to measure a vehicle height; and
    a controller to control the motor using a signal transmitted from the vehicle height sensor;
    wherein each of the plurality of rotary bodies comprises:
        a central hole formed at a central portion in the rotary body, such that the rotary body has a doughnut shape;
        a hole extension formed in the rotary body and radially extending outwards from the central hole; and
        a control groove and a control protrusion provided on respective facing surfaces of two adjacent rotary bodies and corresponding to each other, so that the rotary bodies are converted between a state of being independent of rotation of one rotary body and a state of being dependent on the rotation of the rotary body to rotate along with the rotary body.

2. The automotive steering rack stroke adjusting device as defined in claim 1, wherein lengths of respective control grooves formed in the rotary bodies increase from a medial position to an end of the steering rack.

3. The automotive steering rack stroke adjusting device as defined in claim 2, wherein the control grooves are formed in the surfaces of the rotary bodies which face the medial position of the steering rack, and the control protrusions are formed in the surfaces of the rotary bodies which face the end of the steering rack.

4. The automotive steering rack stroke adjusting device as defined in claim 3, further comprising:
    a cover covering both the rotary bodies and the stop plate of the steering rack;
    a cover control groove formed in the cover so as to limit a range of rotation of the control protrusion of the rotary body located closest to the end of the steering rack.

5. The automotive steering rack stroke adjusting device as defined in claim 4, wherein the rotary bodies comprise first, second, third and fourth rotary bodies overlapping each other and sequentially arranged from the medial portion to the end of the steering rack.

6. The automotive steering rack stroke adjusting device as defined in claim 1, wherein the hole extension comprises two hole extensions formed at opposite positions spaced apart at 180° based on a center of the central hole of the rotary body.

7. The automotive steering rack stroke adjusting device as defined in claim 1, further comprising:
    a gear teeth part formed on a circumferential outer surface of the rotary body located closest to the medial position of the steering rack; and
    an intermediate gear interposed between the gear teeth part and the motor.

8. The automotive steering rack stroke adjusting device as defined in claim 1, wherein the stop plate comprises:
    a main plate body having a predetermined diameter allowing the main plate body to be inserted into the central hole of the rotary body; and
    a plate extension part extending outwards from the main plate body such that the plate extension part is allowed to be inserted into the hole extension of the rotary body.

* * * * *